Patented Jan. 4, 1944

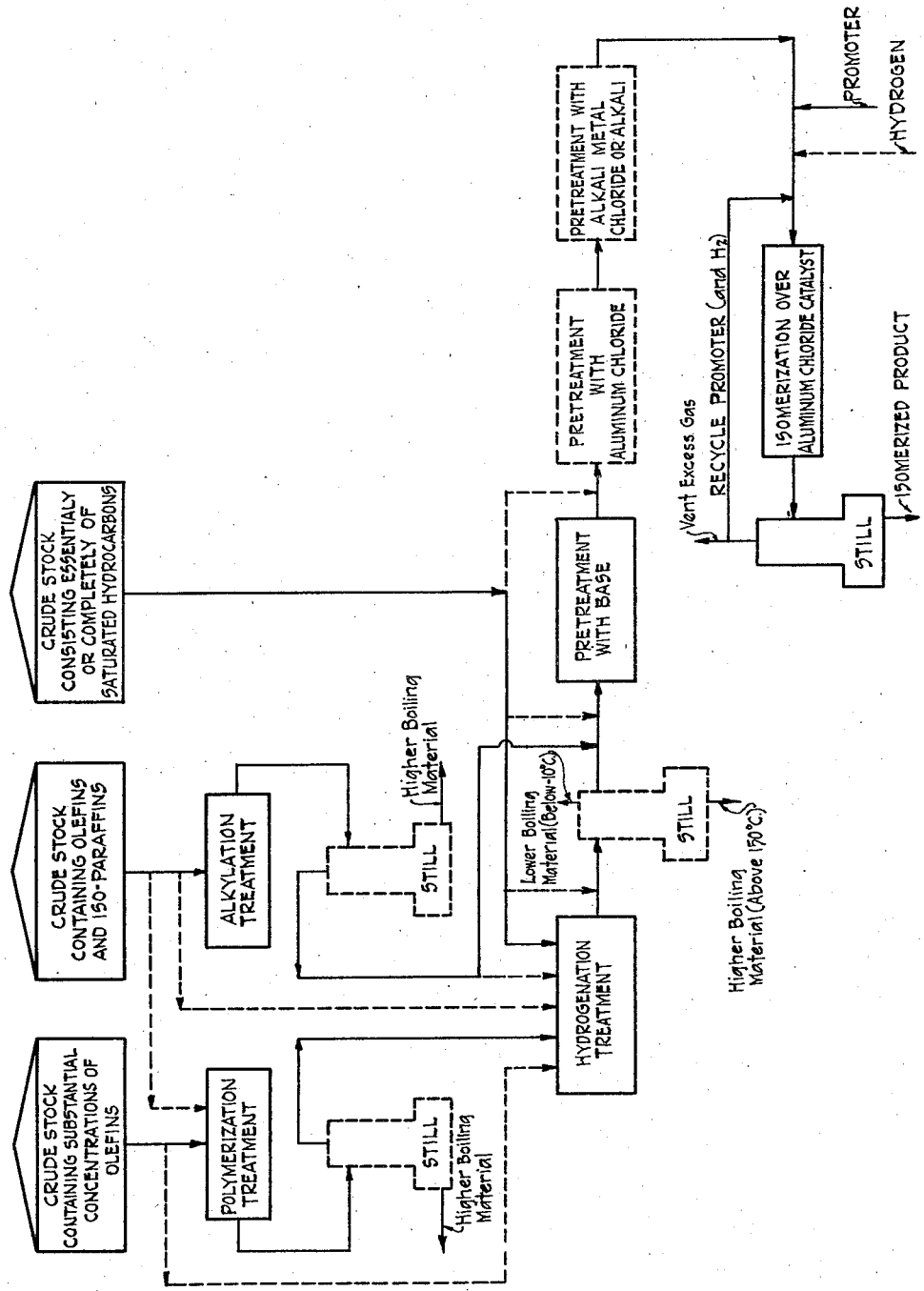

2,338,472

UNITED STATES PATENT OFFICE 2,338,472

ISOMERIZATION OF HYDROCARBONS

Adrianus Johannes van Peski, Amsterdam, Netherlands, assignor to Shell Development Company, San Francisco, Calif., a corporation of Delaware Application April 9, 1940, Serial No. 328,697
In the Netherlands September 16, 1938

6 Claims. (Cl. 260—683.5)

The present invention relates to the catalytic isomerization of hydrocarbons. A particular aspect of the invention relates to the vapor phase isomerization of n-butane to isobutane.

It has long been known that anhydrous aluminum chloride possesses a remarkably strong catalytic influence in various hydrocarbon reactions. It is, for example, one of the most effective cracking and polymerization catalysts known, and is widely used for the cracking of petroleum hydrocarbons into more valuable lower boiling hydrocarbons and for the polymerization of olefins to synthetic lubricating oils. It is also known that aluminum chloride has the ability to catalyze the isomerization of various saturated hydrocarbons. In all of these reactions the catalytic activity of aluminum chloride is promoted by the presence of a hydrogen halide. Indeed, the indications are that in the complete absence of free hydrogen halide, aluminum chloride has no catalytic activity. When using aluminum chloride at such temperatures that appreciable cracking occurs, the necessary hydrogen halide may be formed in the system by interaction of the aluminum chloride and the hydrocarbon, and the addition of extraneous hydrogen halide may be dispensed with. When it is desired, however, to catalyze isomerization reactions, where lower temperatures prevail, the addition of a hydrogen halide (or a material which liberates or forms hydrogen halide under the reaction conditions) is essential to promote the activity of the catalyst. For this reason, in the isomerization of saturated hydrocarbons and distillates composed thereof, it has been necessary to employ appreciable quantities of hydrogen halide, for instance about 3–5%. The hydrogen halide, however, not only promotes the activity of aluminum chloride as regards the isomerization reaction but also greatly increases the cracking activity, i. e., promotes the activity of the aluminum chloride with respect to the rupture of C—C bonds. As a result, the isomerization reactions are invariably accompanied by a certain amount of cracking or degradation reactions. These cracking and degradation reactions are particularly detrimental in the practical execution of isomerization reactions even when they take place only to a small extent, and have greatly restricted the application of catalytic isomerization processes.

The primary products of such degradation reactions are unsaturated hydrocarbons and lower boiling products such, in particular, as methane, ethane and propane. These degradation products are detrimental in catalytic isomerization processes primarily in two ways. The unsaturated hydrocarbons tend to undergo various reactions which lead to the formation of tarry deposits on the catalyst and promote further side reactions. The lower molecule weight products, such as methane, ethane, propane, ethylene and propylene, are also particularly detrimental since they contaminate the product and may lead to further undesirable reactions. The reaction product from the isomerization treatment containing the isomerized and unisomerized hydrocarbons in admixture with the hydrogen halide promoter and the volatile degradation products is usually distilled or stripped to separate the lighter boiling material, including the hydrogen halide promoter plus the volatile degradation products on the one hand, and the desired hydrocarbons on the other. The hydrogen halide promoter recovered is contaminated with degradation products and is usually unfit for reuse. If it is recycled, these degradation products rapidly build up to prohibitive concentrations. In spite of the cost of anhydrous hydrogen halide, it has usually been most profitable to employ as little hydrogen halide as possible (usually not enough to afford the maximum efficiency) and discard it after use.

The difficulties encountered due to degradation reactions are particularly pronounced in the treatment of commercial hydrocarbons and hydrocarbon fractions. This is believed to be due to the presence of small amounts of certain constituents, which initiate the undesired side reactions. As far as the commercial isomerization of saturated hydrocarbons has been undertaken, it has been the practice, to treat only substantially olefin-free stocks in order to minimize the undesirable side reactions. It has also been proposed to treat the reactant mixture (i. e., the hydrocarbon mixed with the hydrogen halide promoter) with a separate portion of catalyst, or a portion of spent catalyst, prior to the isomerization treatment proper. Such a treatment often increases the life of the catalyst to a certain extent, but generally fails to improve the process as far as the concentration of degration products in the product is concerned. This is due to the fact that such a treatment is merely a means of effecting the larger part of the degradation reactions a little earlier in the process in contact with a separate portion of catalyst, but does not generally decrease the amount of degradation products formed. In some cases it has been found advantageous to pretreat the feed by subjecting it to the conventional refining treatment with sulfuric acid. This treatment is capable of effecting a substantial improvement in the case of the very poor quality stocks such, for instance, as certain paraffinic extracts, but does not in general effect a marked improvement with the vast majority of hydrocarbon stocks which are available for isomerization treatment.

The numerous hydrocarbons and hydrocarbon fractions which are available for isomerization and which are treated according to the process of the present invention, may be derived from any number of sources, such, for instance, as thermal and/or catalytic cracking processes, straight-run distillates, casing-head fractions, paraffin and naphthenic extracts, and the like. These distillates invariably contain hydrocarbons of more than one type. Although some of them, such as certain casing-head fractions, may be substantially saturated in character, they nearly all contain at least a small proportion of unsaturated hydrocarbons, and the majority of them contain appreciable concentrations of these hydrocarbons.

The first step toward the preparation of the distillates for isomerization treatment is to remove the unsaturated hydrocarbons. As has been pointed out above, this has previously been done in the case of distillates containing smaller amounts of olefins by a treatment with sulfuric acid. I have found, however, that much better results may be realized by effecting removal of olefins by other means. According to a preferred embodiment of the invention, if the hydrocarbon stock destined for isomerization treatment contains appreciable quantities of olefinic hydrocarbons, it is first subjected to a chemical treatment whereby the olefinic hydrocarbons are converted into hydrocarbons of higher molecular weight. This is preferably done by polymerization (interpolymerization and/or copolymerization) or alkylation. If the olefins are to be removed by polymerization, any of the conventional polymerization processes may be utilized and any of the common polymerization catalysts, such as supported phosphoric acid catalysts, hot sulfuric acid, cold sulfuric acid, and the like, may be employed. One preferred method for removing the undesired olefins is by polymerization with supported phosphoric acid catalysts. Such polymerization processes are well-known and need not be described in detail here. After the polymerization step proper, a part or all of the higher boiling products produced by the polymerization step may be removed from the distillate by fractionation; it is not essential, however, to remove them completely and they may, if desired, remain in the distillate.

In many cases, such, in particular, as when employing a butane-butylene fraction obtained from cracked distillates, or other lower boiling fractions consisting predominantly of lower boiling paraffinic hydrocarbons, it is most desirable to effect the removal of olefins by alkylation. This is usually effected by treating the distillate with strong sulfuric acid or some other suitable alkylation catalyst at low temperatures, according to the known manners. This treatment is more advantageous and is preferred in all such cases where the hydrocarbon fraction contains appreciable quantities of branched-chain paraffin hydrocarbons. By subjecting the hydrocarbon feed to an alkylation treatment, not only are the olefins more effectively removed, but the hydrocarbon fraction is simultaneously given the equivalent of a sulfuric acid refining treatment, and branched-chain paraffins which would necessarily decrease the efficiency of the isomerization treatment are removed. The higher boiling products produced in the alkylation treatment are, furthermore, saturated in character; they are, therefore, more valuable and are less detrimental in the subsequent isomerization step. In certain cases when the hydrocarbon fractions to be treated contain very little olefins (for instance, in the case of certain saturated casing-head or natural gasoline fractions), the preliminary polymerization or alkylation treatment may be dispensed with.

The substantially olefin-free hydrocarbon product, either as such or obtained from one of the above primary treatments (if the polymerization process is used and the polymers formed are not removed, the hydrocarbon fraction will still contain appreciable but reduced quantities of olefins) is preferably subjected to a hydrogenation treatment. This treatment converts any traces of olefins, if these are present, to saturated hydrocarbons. The hydrogenation treatment is, however, very beneficial even if olefins appear to be absent. The reason for this is not definitely known, but it may be due to the reduction of traces of certain refractory sulfur impurities to the reduction of traces of peroxides or other oxygenated bodies and/or to the decyclization of traces of labile ring compounds. The hydrogenation treatment is preferably executed in the conventional manner with the aid of sulph-active catalysts, such for example, as molybdenum sulfide.

Irrespective of the manner of the prior treatments, the hydrocarbon fraction to be isomerized is advantageously subjected to a treatment with a base. This may be conveniently effected by passing the hydrocarbon fraction through a suitable packed chamber or scrubbing tower filled with a suitable basic reagent. Various basic compounds which are suitable for the treatment are, for example, the various basic hydroxides, oxides, carbonates, borates, phosphates, etc., of the alkali and alkaline earth metals, and aqueous solutions of certain strong organic bases which are insoluble in the hydrocarbon fraction. While any of these bases may be used, the improvement in the hydrocarbon is most noticeable when employing very strong bases, such as the alkaline metal hydroxides. These may be employed either as aqueous solutions, deposited upon adsorptive carriers, or in the form of solid bodies. Particularly favorable results are obtained when the base is used in a substantially anhydrous condition. This is believed to be due to the fact that such bases also tend to remove traces of water and/or hydrogen sulfide which may be formed in the hydrogenation treatment or present in the original hydrocarbon fraction.

At some point in the pretreatment of the distillate, preferably after the hydrogenation treatment, it is advantageous to subject the hydrocarbon fraction to a distillation or topping treatment. In this treatment it is preferable to remove any materials boiling below about −10° C. and above about 150° C., if such materials are present. This treatment is often of considerable benefit even in such cases where the material does not contain any hydrocarbons boiling outside of the above-mentioned limits. This is believed to be due to the removal of traces of certain detrimental dissolved gases.

The above-described treatments of the hydrocarbon fraction destined for isomerization treatment, when applied in combination and in certain sub-combinations, depending somewhat upon the character of the hydrocarbon fraction, effect a substantial improvement in the economy of the isomerization process. By the use of appropriate pretreatments, the life of aluminum chloride catalysts in the isomerization treatment is greatly prolonged; furthermore, a most important effect of these pretreatments is to substantially decrease the concentration of the degradation products in the product. When the hydrocarbon fraction is properly pretreated as above described, it therefore becomes commercially practical to recycle the hydrogen halide promoter separated from the isomerization product. This results in a substantial saving in the amount of hydrogen halide required for the isomerization process, as well as a substantial decrease in cost due to catalyst renewal.

The above-described method for working up hydrocarbon fractions for use in isomerization processes generally provides hydrocarbon fractions which are exceptionally well-suited for isomerization with aluminum chloride catalysts. In some cases, however (particularly if the hydrogenation treatment has been omitted), it is found that a pretreatment with aluminum chloride can be of value. As has been stated above, it has already been suggested to pretreat the reactant mixture by passing the hydrocarbon in admixture with the desired concentration (usually 2–5%) of hydrogen halide promoter in contact with a small section of catalyst (or spent catalyst) in order to destroy labile impurities of unknown composition which tend to poison the isomerization catalyst. Also, as pointed out above this treatment does not usually materially decrease the amount of degradation products found in the isomerization products. This treatment with aluminum chloride is, however, preferably not executed as hitherto proposed, but in a different way. According to the process of the present invention, the pretreatment with aluminum chloride, if this is employed, is effected by passing the hydrocarbon fraction in contact with an aluminum chloride catalyst in the absence of a substantial amount of hydrogen halide promoter. Thus, the hydrocarbon fraction is treated prior to the addition of the promoter. This simple change results in a complete change in the function of the treatment. When treating a hydrocarbon fraction, in admixture with the desired concentration of hydrogen halide promoter with aluminum chloride catalyst in the hitherto proposed manner, the effect of the treatment is to effect the same undesirable side reactions prior to contacting with the catalyst proper. Even if the pretreatment is effected at a lower temperature, for instance in the liquid phase, the results are qualitatively not changed since the hydrocarbon fraction and hydrogen halide dissolve and carry a certain amount of aluminum chloride, and the same undesirable reactions take place as soon as the reaction mixture is heated to the reaction temperature. If the hydrocarbon feed is pretreated with aluminum chloride in the absence of hydrogen halide, on the other hand, the treatment is much more mild. Traces of unstable impurities, if present, are polymerized or converted into non-detrimental materials and substantially no volatile degradation products are formed. For the pretreatment of the feed with aluminum chloride, it is most advantageous to apply the aluminum chloride on a suitable support. Thus, for example, the aluminum chloride may be conveniently mixed with a powdered carrier and the mixture pilled, or the aluminum chloride may be impregnated into pieces of adsorptive carrier material.

If a pretreatment of the feed with aluminum chloride is applied, it is often advantageous, though not essential, to also subject the feed to yet another pretreatment to remove any last traces of the aluminum chloride prior to bringing it up to the reaction temperature. Such a treatment may be conveniently effected by passing the feed through a tower or chamber packed with a material which is capable of removing traces of aluminum chloride. Such suitable materials are, for example, various hydrocarbon-insoluble alkalides and alkali metal chlorides, such as NaCl, which have the ability to combine with aluminum chloride to form double salts.

The hydrocarbon feed, after appropriate pretreatment, is subjected to an isomerization treatment over an aluminum chloride catalyst in the presence of a suitable concentration of hydrogen halide in any of the conventional manners. Suitable methods are disclosed for instance in British Patent Nos. 498,463 and 498,512. Other suitable methods are described in U. S. Patents No. 2,249,366, No. 2,250,410 and No. 2,271,043, and in copending application Serial No. 303,314, filed November 7, 1939. In the isomerization of hydrocarbons with aluminum chloride catalysts the presence of free hydrogen has been found to be advantageous in may cases. In such cases where hydrogen is to be applied, it is preferably substantially free of carbon monoxide and/or volatile sulfur compounds. Thus, for example, if the hydrogen used is produced by the conversion of methane with steam, it is preferably pretreated to remove carbon monoxide before use. Likewise the hydrogen employed in the above-described hydrogenation treatment may be subjected to suitable purification if the use of hydrogen from an impure source is contemplated. When operating with feeds pretreated as above described, the products consist essentially of the hydrocarbon isomers in admixture with the hydrogen halide promoter (and hydrogen, if this is also employed), and very little low-boiling degredation products are present. The hydrogen halide promoter (and hydrogen, if this is used) may be separated from the mixture by simple methods such as by distillation (stripping), and the recovered hydrogen halide (or mixture of hydrogen halide and added hydrogen) is entirely suitable for recyclization in the process with the incoming feed. By operating in this manner the consumption of hydrogen halide promoter (and hydrogen, if this is used) is reduced to a minimum. Also, due to the lesser amount of degradation products formed, the catalyst may be employed over much longer periods of time with a higher average activity.

The various treatments employed according to the invention to prepare hydrocarbon stocks for catalytic isomerization are illustrated diagrammatically in the attached flow diagram. The flows shown in full lines are those preferred; those shown in broken lines are optional alternative flows. Treating steps shown in broken lines may be omitted if desired or placed in different locations in the flow. Referring to the flow diagram, it is seen that the various hydrocarbon stocks may be roughly divided into three classes, according to their constitution, and that certain variations in the treatment are possible depending upon the character of the stock. Thus, if the hydrocarbon stock contains substantial quantities of olefines and very little branched-chain paraffins, it is preferably first subjected to a polymerization treatment, followed by the hydrogenation treatment, but may also, if desired (particularly when the olefin content is rather low), be subjected directly to the hydrogenation treatment. If the stock contains appreciable quantities of isoparaffins, it is preferably first subjected to an alkylation treatment, but may, if desired, be treated like a stock of the former type by polymerization. The product from the polymerization treatment is preferably subjected to a hydrogenation treatment as described. The products from the polymerization or alkylation treatment are preferably fractionated as shown, although, as stated above, this additional step may be omitted in many cases, especially in such cases where only small amounts of high boiling material are produced in the polymerization or alkylation step. If the feed contains very small amounts of olefines it is preferably first subjected to a hydrogenation treatment. In certain cases, however, when the stock is of very high-grade and contains no olefines, the hydrogenation treatment may be omitted. The products from the hydrogenation treatment are preferably stripped as described, and then subjected to a treatment with a basic agent. The pretreatment with aluminum chloride, preferably followed by a treatment with an alkali or alkali metal chloride, is preferred but not usually essential, provided that the feed has been treated, as described, by hydrogenation, etc.

The following examples illustrate the treatment of commercial butane-butylene fractions and isomerization of n-butane to isobutane by suitable combinations of treatments comprised within the scope of the invention.

*Example I*

The stock treated is a butane-butylene fraction derived from cracking operations. This stock is first subjected to a conventional polymerization treatment with a catalyst comprising phosphoric acid deposited upon an absorptive mineral carrier. The product from the polymerization treatment, after fractionation to remove high boiling products, is then hydrogenated at about 250–300° C. and a pressure of 100–130 atmospheres with a commercial molybdenum sulphide catalyst. The product from the hydrogenation treatment is then passed through a stripping column packed with Raschig rings and provided with a lower heating coil and an upper cooling coil wherein dissolved gases containing some carbon monoxide and traces of lower boiling hydrocarbons are removed overhead. The stripped hydrocarbon fractions issuing from the stripping column are cooled and led through a tower filled with pieces of solid potassium hydroxide. The stripped and alkali-treated hydrocarbon fraction is then led through a tower packed with tablets pressed from a mixture of anhydrous aluminum chloride and kaolin, and finally through a tower packed with pieces of sodium chloride. The thus-treated butane is then vaporized, mixed with a suitable concentration of hydrogen chloride promoter and pressed at about 10 atmospheres pressure and about 100–120° C. through a reactor tube packed with pilled aluminum chloride catalyst (20–50% AlCl$_3$+70–50% pipe clay). The product from the isomerization treatment is passed through a suitable fractionation or stripping column wherein the hydrogen chloride applied, as well as any other lower boiling materials, are separable from the desired hydrocarbon fraction. The separated hydrogen chloride, containing small quantities of other volatile products, is recycled with the feed entering the isomerization reactor. In order to prevent the formation of catalyst poisons by the action of the hydrogen halide upon metal equipment, moving parts in contact with hydrogen chloride are lubricated with an acid resistant lubricant such as an artificial lubricant prepared by the polymerization of olefines.

*Example II*

A butane-butylene fraction consisting largely of n-butane is hydrogenated and the hydrogenated product, containing about 89 mol percent of n-butane, 10 mol percent isobutane and 1 mol percent hydrogen is passed through a chamber packed with solid potassium hydroxide or silica gel. The thus-treated feed is then led at ordinary temperatures through a chamber packed with solid aluminum chloride and finally through a chamber packed with common salt. The hydrocarbon feed is then mixed with about 8 mol percent of hydrogen chloride and isomerized with a pilled aluminum chloride catalyst containing about 70% by weight of aluminum chloride and 30% by weight of dried kaolin. In the isomerization step the feed is introduced at the bottom of the reactor and passes up through the catalyst at a rate of about 0.65 kg. per liter catalyst per hour. The temperature and pressure in the isomerization reactor is about 90–95° C. and 15 atmospheres, respectively. The reaction products leaving the top of the isomerization tower are cooled to separate entrained aluminum chloride and then subjected to a suitable stripping treatment to separate the hydrogen chloride promoter and any other lower boiling materials from the butane. Only about 1% of products from side reactions are formed and the recovered hydrogen halide is well suited to be recycled in the isomerization step with the incoming feed. The active life of the isomerization catalyst is, furthermore, exceptionally long. Thus, after 500 hours of continuous operation the activity of the catalyst is not substantially changed.

The present invention is a continuation-in-part of my copending application, Serial No. 293,427 filed September 5, 1939, now matured into U. S. Patent No. 2,271,043.

While I have described my invention in its preferred embodiments and have given specific examples illustrating its use, I realize that certain modifications which will be readily apparent to those skilled in the art, will be desirable in many cases, depending upon the character of the material treated. All such modifications which fall within the spirit of the invention are, therefore, intended to be embraced within the scope of the appended claims.

I claim as my invention:

1. In a process for the catalytic isomerization of hydrocarbons, wherein a saturated hydrocarbon is subjected to a catalytic isomerization treatment in the presence of hydrogen chloride promoter and an aluminum chloride isomerization catalyst and hydrogen chloride is separated from the reaction product and recycled with the incoming feed to the isomerization zone, the method of increasing the active life of the isomerization catalyst and decreasing the rate of dilution of the recycled hydrogen chloride promoter with gaseous degradation products which comprises the combination of steps of subjecting the hydrocarbon fraction to be isomerized to a catalytic hydrogenation treatment to produce a substantially olefine-free hydrocarbon fraction, subjecting the thus treated hydrocarbon fraction to a topping treatment to remove traces of materials boiling below about −10° C., and treating the substantially olefine-free hydrocarbon fraction with a substantially hydrocarbon-insoluble alkali.

2. In a process for the catalytic isomerization of butane, wherein a saturated hydrocarbon fraction consisting essentially of butane is subjected to a catalytic isomerization treatment in the presence of hydrogen chloride promoter and an aluminum chloride isomerization catalyst, and hydrogen chloride is separated from the reaction product and recycled with the incoming feed to the isomerization zone, the method of increasing the active life of the isomerization catalyst and decreasing the rate of dilution of the recycled hydrogen chloride promoter with gaseous degradation products which comprises the combination of steps of subjecting the thus treated butane fraction to a catalytic hydrogenation treatment to produce a substantially olefine-free butane fraction, subjection the thus treated butane fraction to a topping treatment to remove traces of materials boiling below about −10° C., and treating the substantially olefine-free butane fraction with a substantially hydrocarbon-insoluble alkali.

3. Process according to claim 1, further characterized in that the larger portion of the olefinic impurities in the feed to be isomerized is removed prior to said hydrogenation treatment by reaction to produce higher molecular weight hydrocarbons which are separated by fractional distillation.

4. A process according to claim 2, further characterized in that the larger portion of the olefinic impurities in the feed to be isomerized is removed prior to said hydrogenation treatment by reaction to produce higher molecular weight hydrocarbons which are separated by fractional distillation.

5. A process according to claim 1, further characterized in that the substantially olefine-free hydrocarbon fraction, after said treatment with a substantially hydrocarbon insoluble alkali, is contacted with aluminum chloride in the absence of added hydrogen chloride promoter prior to being subjected to the isomerization treatment.

6. A process according to claim 2, further characterized in that the substantially olefine-free hydrocarbon fraction, after said treatment with a substantially hydrocarbon insoluble alkali, is contacted with aluminum chloride in the absence of added hydrogen chloride promoter prior to being subjected to the isomerization treatment.

ADRIANUS JOHANNES van PESKI.